United States Patent
Kim et al.

(10) Patent No.: US 9,988,100 B2
(45) Date of Patent: Jun. 5, 2018

(54) FRONT VEHICLE BODY STRUCTURE

(71) Applicant: Hyundai Motor Company, Seoul (KR)

(72) Inventors: Heeju Kim, Seoul (KR); Mun Soo Cha, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 19 days.

(21) Appl. No.: 15/192,442

(22) Filed: Jun. 24, 2016

(65) Prior Publication Data

US 2017/0166258 A1    Jun. 15, 2017

(30) Foreign Application Priority Data

Dec. 14, 2015 (KR) ........................ 10-2015-0178659

(51) Int. Cl.
| | |
|---|---|
| *B60J 7/00* | (2006.01) |
| *B62D 27/02* | (2006.01) |
| *B62D 25/08* | (2006.01) |

(52) U.S. Cl.
CPC ......... *B62D 27/023* (2013.01); *B62D 25/082* (2013.01)

(58) Field of Classification Search
CPC .... B62D 25/082; B62D 21/152; B62D 25/04; B62D 25/088; B62D 25/14; B62D 1/28; B60P 3/08; G07B 15/063; G01S 13/931; G01C 21/28
See application file for complete search history.

(56) References Cited

U.S. PATENT DOCUMENTS

| | | | | | |
|---|---|---|---|---|---|
| 4,712,829 | A | * | 12/1987 | Hurten ................. | B62D 25/082 296/203.02 |
| 4,789,198 | A | * | 12/1988 | Ide ....................... | B62D 25/081 296/192 |
| 4,909,565 | A | * | 3/1990 | Harasaki .............. | B62D 21/152 296/187.09 |
| 5,201,566 | A | * | 4/1993 | Mori ..................... | B62D 21/11 296/192 |
| 5,346,276 | A | * | 9/1994 | Enning ................ | B62D 25/082 296/187.09 |
| 6,068,330 | A | * | 5/2000 | Kasuga ................ | B62D 29/008 188/377 |
| 6,179,372 | B1 | * | 1/2001 | Sakamoto ............ | B62D 25/082 280/779 |
| 6,203,099 | B1 | * | 3/2001 | Iwatsuki ............... | B62D 21/10 296/204 |

(Continued)

FOREIGN PATENT DOCUMENTS

| | | |
|---|---|---|
| JP | 2003-205855 A | 7/2003 |
| JP | 2004-155350 A | 6/2004 |
| JP | 2010-006154 A | 1/2010 |

*Primary Examiner* — Kiran B Patel
(74) *Attorney, Agent, or Firm* — Mintz Levin Cohn Ferris Glovsky and Popeo, P.C.; Peter F. Corless

(57) ABSTRACT

A front vehicle body structure includes: lower side members extended in a length direction of a vehicle, and disposed at left and right sides in a width direction of the vehicle; a dash lower cross reinforcement member extended in the width direction of the vehicle, and to which a rear end of each of the front lower side members in the length direction of the vehicle is coupled; and joints to which the rear ends of the left and right front lower side members and the dash lower cross reinforcement member are coupled, which can result in enhanced structural rigidity of the vehicle front body.

19 Claims, 19 Drawing Sheets

(56) References Cited

U.S. PATENT DOCUMENTS

| | | | | |
|---|---|---|---|---|
| 6,273,486 B1* | 8/2001 | Ezzat | ............ | B62D 27/00 296/187.09 |
| 6,332,642 B1* | 12/2001 | Hanyu | ............ | B62D 25/082 296/198 |
| 6,705,670 B2* | 3/2004 | Forssell | ............ | B62D 25/082 296/187.09 |
| 6,817,657 B2* | 11/2004 | Watanabe | ............ | B62D 25/081 180/90 |
| 6,929,314 B2* | 8/2005 | Hanyu | ............ | B62D 21/152 296/203.02 |
| 7,325,866 B2* | 2/2008 | Horton | ............ | B62D 21/02 280/785 |
| 7,469,957 B1* | 12/2008 | Boettcher | ............ | B62D 21/02 296/193.07 |
| 7,578,545 B2* | 8/2009 | Fujikawa | ............ | B62D 21/152 296/187.08 |
| 7,677,643 B2* | 3/2010 | Nakamura | ............ | B62D 25/20 296/187.08 |
| 7,828,330 B2* | 11/2010 | Tamura | ............ | B62D 25/088 280/124.109 |
| 8,419,116 B2* | 4/2013 | Boettcher | ............ | B60R 19/24 293/133 |
| 8,459,728 B2* | 6/2013 | Fujii | ............ | B62D 21/152 296/187.09 |
| 8,490,988 B2* | 7/2013 | Takeshita | ............ | B62D 21/11 280/124.109 |
| 8,585,134 B2* | 11/2013 | Yasui | ............ | B62D 21/152 296/204 |
| 8,602,454 B1* | 12/2013 | Baccouche | ............ | B60K 1/04 180/68.5 |
| 8,668,252 B2* | 3/2014 | Yasuhara | ............ | B62D 21/11 296/187.08 |
| 8,702,148 B2* | 4/2014 | Ichikawa | ............ | B62D 25/08 180/90 |
| 8,720,983 B1* | 5/2014 | Edwards | ............ | B62D 21/152 296/187.09 |
| 8,746,718 B2* | 6/2014 | Otani | ............ | B60G 7/02 280/124.109 |
| 8,777,300 B2* | 7/2014 | Kim | ............ | B62D 25/088 296/192 |
| 8,960,776 B2* | 2/2015 | Boettcher | ............ | B62D 33/023 296/193.07 |
| 9,108,680 B2* | 8/2015 | Suzuki | ............ | B62D 25/082 |
| 9,227,665 B2* | 1/2016 | Mildner | ............ | B62D 25/04 |
| 9,266,567 B1* | 2/2016 | Young | ............ | B62D 24/04 |
| 9,381,952 B2* | 7/2016 | Furusaki | ............ | B62D 21/152 |
| 9,440,682 B2* | 9/2016 | Saje | ............ | B62D 25/2018 |
| 9,505,295 B2* | 11/2016 | Watanabe | ............ | B60K 5/12 |
| 9,545,950 B2* | 1/2017 | Lee | ............ | B62D 21/152 |
| 9,604,673 B2* | 3/2017 | An | ............ | B62D 21/152 |
| 9,610,980 B2* | 4/2017 | Nakauchi | ............ | B62D 21/152 |
| 2001/0020797 A1* | 9/2001 | Saeki | ............ | B62D 21/15 296/203.03 |
| 2005/0189788 A1* | 9/2005 | Cornell | ............ | B62D 21/155 296/187.09 |
| 2006/0061143 A1* | 3/2006 | Okana | ............ | B62D 21/10 296/204 |
| 2010/0171340 A1* | 7/2010 | Yasuhara | ............ | B62D 21/11 296/205 |
| 2012/0306234 A1* | 12/2012 | Akaki | ............ | B62D 21/02 296/187.03 |
| 2016/0368535 A1* | 12/2016 | Kim | ............ | B62D 21/08 |
| 2017/0021866 A1* | 1/2017 | Kim | ............ | B62D 25/14 |
| 2017/0043810 A1* | 2/2017 | Kim | ............ | B62D 21/09 |

* cited by examiner

FRONT VEHICLE BODY STRUCTURE

CROSS-REFERENCE TO RELATED APPLICATION

This application claims under 35 U.S.C. § 119(a) the benefit of Korean Patent Application No. 10-2015-0178659 filed in the Korean Intellectual Property Office on Dec. 14, 2015, the entire contents of which are incorporated herein by reference.

BACKGROUND

(a) Field of the Invention

The present invention relates to a front vehicle body structure, more particularly, to a front vehicle body structure formed by coupling space frames.

(b) Description of the Related Art

In general, a front vehicle body of a vehicle is a frame structure which is positioned at a front side in a longitudinal direction of the vehicle while forming an engine compartment, and includes a front end module which forms a front side of the engine compartment and accommodates a cooling module, a head lamp, etc., a front fender apron member which forms the left and right sides of the engine compartment and accommodates a suspension system and has a space in which wheels are installed, and a dash panel which is positioned at the rear of the engine compartment and partitions a passenger compartment and the engine compartment.

Also, below the engine compartment, front side members extending in the longitudinal direction of the vehicle are disposed at left and right sides, respectively, to reinforce the structural strength of the front vehicle body, and a sub-frame is disposed below the front side member and coupled with the front side member so as to install and support the engine and a transmission at the engine compartment as well as a suspension system, etc.

A high performance vehicle tends to lighten the weight of the vehicle to improve running performance of the vehicle, and space frames, each made of an aluminum material which is relatively lighter than steel are coupled to lighten the weight of the vehicle.

In such an aluminum space frame vehicle body, rigidity of a dash portion is increased to improve front collision response performance of the vehicle, thereby safely protecting passengers and improve riding and handling (R&H) performance to thereby improve marketability of the vehicle.

The above information disclosed in this Background section is only for enhancement of understanding of the background of the invention and therefore it may contain information that does not form the prior art that is already known in this country to a person of ordinary skill in the art.

SUMMARY

The present invention provides a front vehicle body structure that can improve riding and handling (R&H) performance by enhancing rigidity of a vehicle by rigidly connecting left and right front side members and safely protect passengers by properly distributing an impact load transferred through the front side members to other portions of the vehicle when a collision occurs.

A front vehicle body structure according to an exemplary embodiment of the present invention includes: lower side members extended in a length direction of a vehicle, and disposed at left and right sides in a width direction of the vehicle; a dash lower cross reinforcement member extended in the width direction of the vehicle, and to which a rear end of each of the front lower side members in the length direction of the vehicle is coupled; and joints to which the rear ends of the left and right front lower side members and the dash lower cross reinforcement member are coupled.

Reinforcement brackets may be attached to corners where the front lower side members and the dash lower cross reinforcement member intersect. The reinforcement bracket may be attached while filling a portion of the corner.

The reinforcement bracket may be formed in the shape of a triangular block. Ends of the dash lower side members may be coupled to lateral ends of the dash lower cross reinforcement member in the width direction of the vehicle, and other ends of the dash lower side members may be coupled to a side seal extended in the length direction of the vehicle.

The dash lower cross reinforcement members may have multiple cross-sections.

The multiple cross-sections may include: a triangular-shaped first cross-section; a pentagonal-shaped second cross-section sharing an oblique side of the first cross-section; and a quadrangular-shaped third cross-section sharing the oblique side of the first cross-section and the bottom side of the second cross-section.

The dash lower cross reinforcement member may be extrusion-molded using a single extruded material.

One end of a rear side lower reinforcement member obliquely disposed in a length directional front side of the vehicle and a height directional upper side of the vehicle may be coupled by being inserted to lateral ends of the dash lower cross reinforcement member in the width direction of the vehicle, and the other end of the rear side lower reinforcement member may be connected to a dash center cross reinforcement member extended in the width direction of the vehicle.

The joint may include: a joint body formed in the shape of a quadrangular plate; an upper flange bent inward in the width direction of the vehicle from an upper end edge of the joint body and thus coupled to an upper surface of the front lower side member in the height direction of the vehicle; and a lower flange bent inward in the width direction of the vehicle from a lower end edge of the joint body and thus coupled to a bottom surface of the front lower side member in the height direction of the vehicle.

The front vehicle body structure may further include: an upper extension flange disposed in an upper portion in the height direction of the vehicle by being further extended to a rear side from a rear side upper end edge of the joint body in the length direction of the vehicle; and a lower extension flange disposed in a lower portion in the height direction of the vehicle by being further extended to a rear side from a rear side lower end edge of the joint body in the length direction of the vehicle, wherein the dash lower cross reinforcement member may be coupled by being inserted between the upper extension flange and the lower extension flange.

Two fastening bosses, each provided with a fastening hole, may be formed by protruding in the joint body and the two fastening bosses are disposed at a distance from each other in the length direction of the vehicle, and one end of a lower arm may be coupled by being fastened to the fastening holes.

A plurality of radial ribs may be formed by integrally protruding in the joint body, and the plurality of radial ribs connect the two fastening bosses to each other and connect the respective fastening bosses to the joint body to enhance structural rigidity.

An inclined surface inclined in the length direction of the vehicle and a lower side in the height direction of the vehicle may be formed adjacent to the upper extension flange such that a rear side lower reinforcement member inclined in a front side of the length direction of the vehicle and an upper side of the height direction of the vehicle may be coupled by being mounted to the inclined surface.

The second cross-section of the dash lower cross reinforcement member may be cut such that a coupling groove is formed, and a rear side lower reinforcement member inclined in a front side of the length direction of the vehicle and an upper side of the height direction of the vehicle may be coupled by being inserted to the coupling groove.

The joint body may be provided with an expansion horizontal surface expanded in the shape of a triangle to the outer side in the width direction of the vehicle and a quadrangular-shaped expansion vertical surface extended upward in the height direction of the vehicle from one edge of the expansion horizontal surface.

The dash center cross reinforcement member and the dash lower cross reinforcement member may be connected to each other by two front tunnel side members.

The two front tunnel side members may extend with an inclination in the height direction of the vehicle and a front side in the length direction of the vehicle, and may be disposed at a distance from each other along the width direction of the vehicle such that an entrance of a tunnel extended in a rear side along the length direction of the vehicle is formed.

The dash lower cross reinforcement member may cross the tunnel and may be made of a single extruded material.

The dash lower cross reinforcement member, a rear upper cross reinforcement member disposed higher than the dash center cross reinforcement member in the height direction of the vehicle and extended in the width direction of the vehicle, a cowl cross upper member disposed higher than the rear upper cross reinforcement member and extended in the width direction of the vehicle, and front pillar members extended in the height direction of the vehicle and disposed in the left and right sides of the vehicle may form a "目" shaped truss structure.

According to the exemplary embodiment of the present invention, the left and right front lower side members are rigidly connected with each other by the dash lower cross reinforcement member, and the vehicle members are connected with each other while substantially forming "目" shaped truss structure such that stiffness of the vehicle, specifically structural rigidity is enhanced, thereby improving R&H performance and marketability of the vehicle.

Since vehicle stiffness and connection rigidity are improved, impact load from a collision of the vehicle can be appropriately distributed and transferred to provide enhanced vehicle safety.

The front lower side members and the dash lower cross reinforcement member form multiple cross-sections such that structural rigidity and interconnection can be improved.

The front side members manufactured through an extrusion method and the joints manufactured through a die-casting method are properly coupled such that coupling rigidity between the front side member and the joint can be enhanced, and when a suspension arm is mounted to the joint, mounting rigidity of the suspension arm is enhanced, thereby improving driving performance of the vehicle.

The shape of the joint manufactured through the expensive die-casting method is optimized to thereby save manufacturing cost of the front vehicle body and lightening the weight of the front vehicle body.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "er", "or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present invention will be described in detail with reference to the accompanying drawings.

Figure 1:
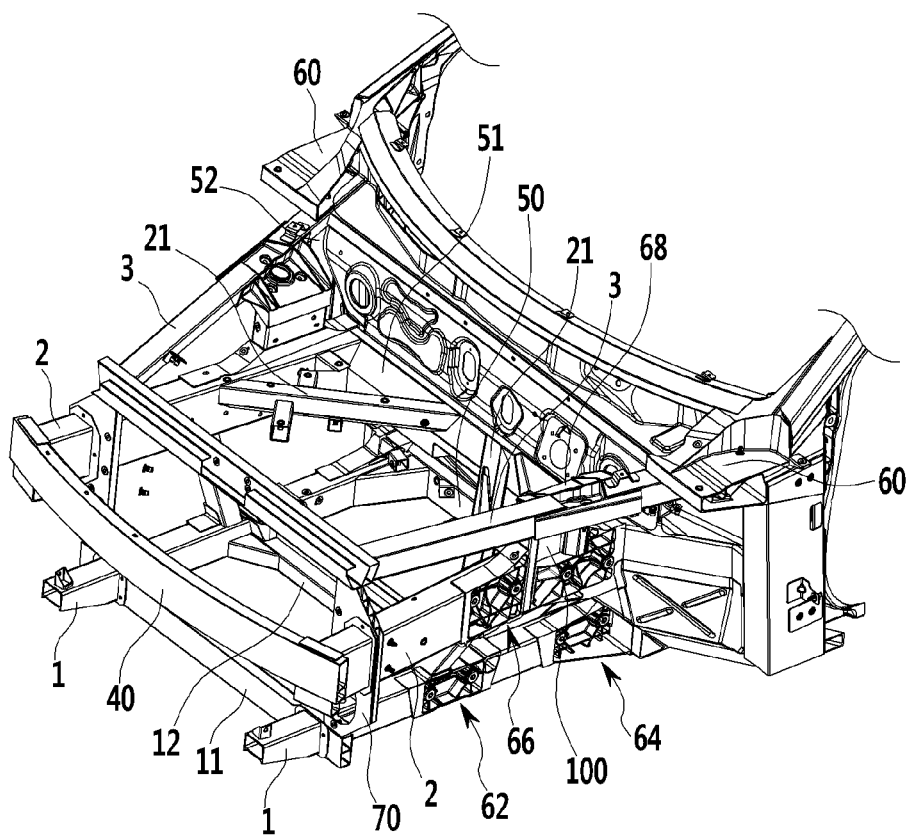
FIG. 1 is a perspective view of a front vehicle body structure according to an exemplary embodiment of the present invention.
Figure 2:
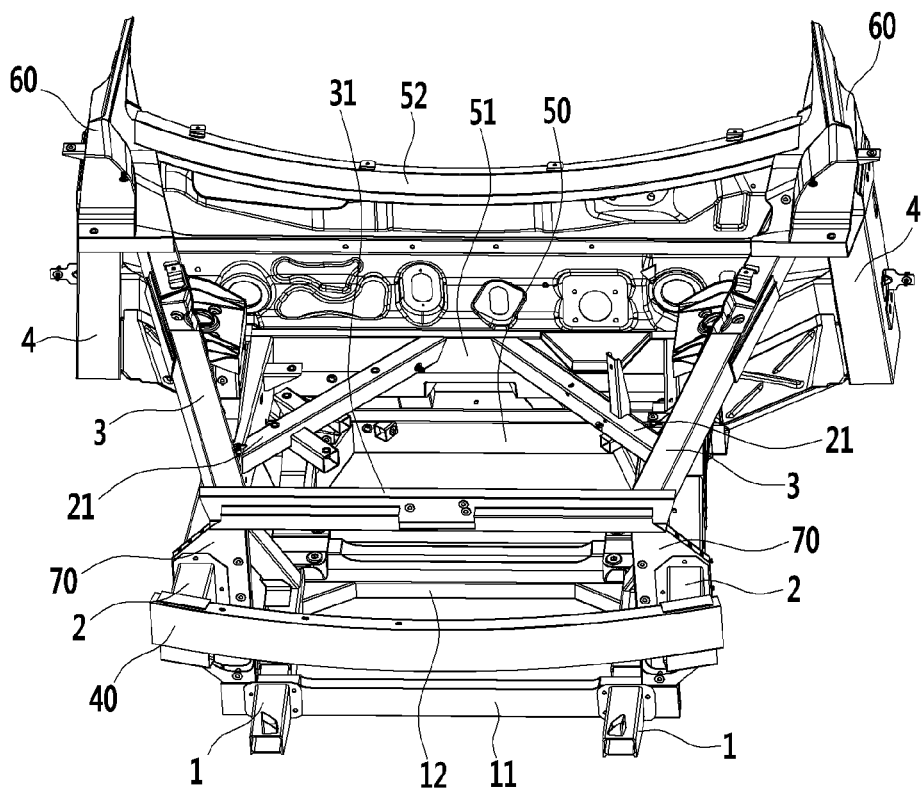
FIG. 2 is a view of the front vehicle body structure according to the exemplary embodiment of the present invention.
Figure 3:
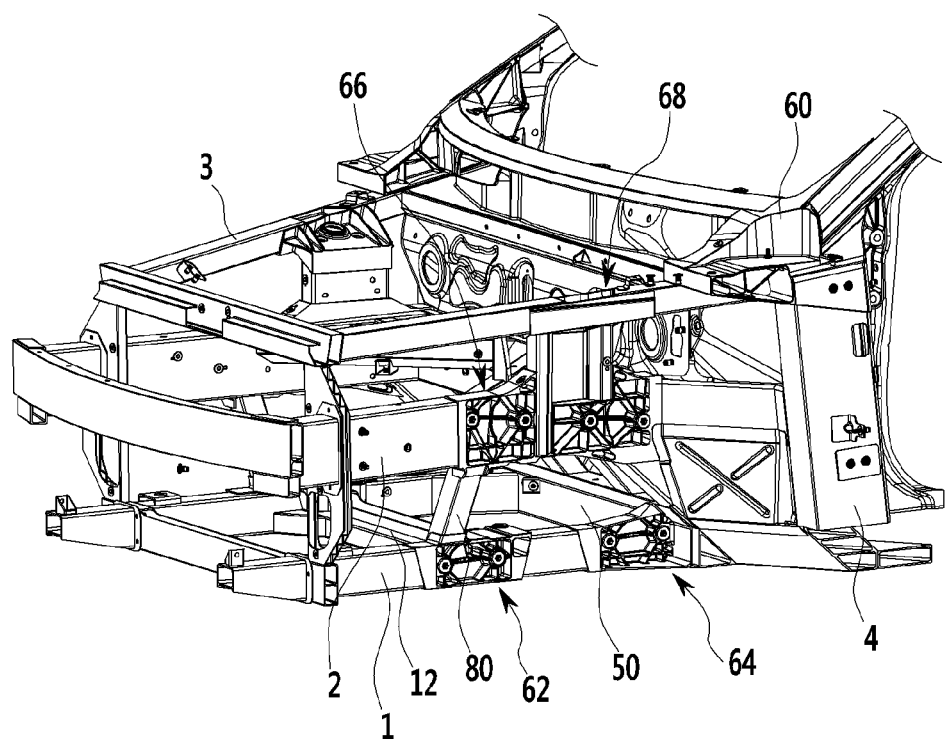
FIG. 3 is an enlarged perspective view of the front vehicle body structure according to the exemplary embodiment of the present invention.

Referring to FIGS. 1 to 3, a front vehicle body structure according to an exemplary embodiment of the present invention may include front lower side members 1, front upper side members 2, and fender apron upper members 3 that extend in a length direction of a vehicle.

Along the height direction of the vehicle, the front lower side members 1 may be disposed in a lower portion, the front upper side members 2 may be disposed in a center, and the fender apron upper members 3 may be disposed in an upper portion.

Front portions of the left and right front lower side members 1 in the length direction of the vehicle may be connected to each other by a front lower cross reinforcement member 11, center portions thereof may be connected to each other by a center lower cross reinforcement member 12 extending in a width direction of the vehicle, and rear portions thereof may be connected to each other by a dash lower cross reinforcement member 50 extending in the width direction of the vehicle.

The front portions of the left and right front upper side members 2 in the length direction of the vehicle may be connected to each other by a bumper beam 40 extending in the width direction of the vehicle, and the rear portions of the front upper side members 2 may be connected to each other by a dash center cross reinforcement member 51 extending along the width direction of the vehicle.

The left and right front upper side members 2 and the dash center cross reinforcement member 51 may be connected to each other by two sloping reinforcement members 21 obliquely disposed along the width direction and the length direction of the vehicle.

The two sloping reinforcement members 21 are respectively disposed to be inclined outwardly in the width direction of the vehicle from a center portion of substantially the length direction (i.e., width direction of the vehicle) of the dash center cross reinforcement member 51 and then may be attached to the left and right front upper side members 2.

Referring to FIG. 2, the front upper side members 2 become more distant outward in the width direction than the front lower side members 1, and accordingly, the front upper side members 2 can reduce impact energy by properly absorbing impact energy when a front small overlap collision occurs such that small overlap front crash response performance of the vehicle can be improved.

Two front pillar members 4 extended in a height direction of the vehicle may be disposed at left and right sides in the width direction of the vehicle.

Front portions of the left and right fender apron upper members 3 in the length direction of the vehicle may be connected to each other by a front upper cross reinforcement member 31 extending along the width direction of the vehicle, and rear fore-ends of the left and right fender apron upper members 3 may be connected to the left and right front pillar members 4 by first joints 60, respectively.

Lateral ends of a cowl upper cross reinforcement member 52 extended in the width direction of the vehicle may be respectively coupled to the left and right first joints 60.

Figure 4:
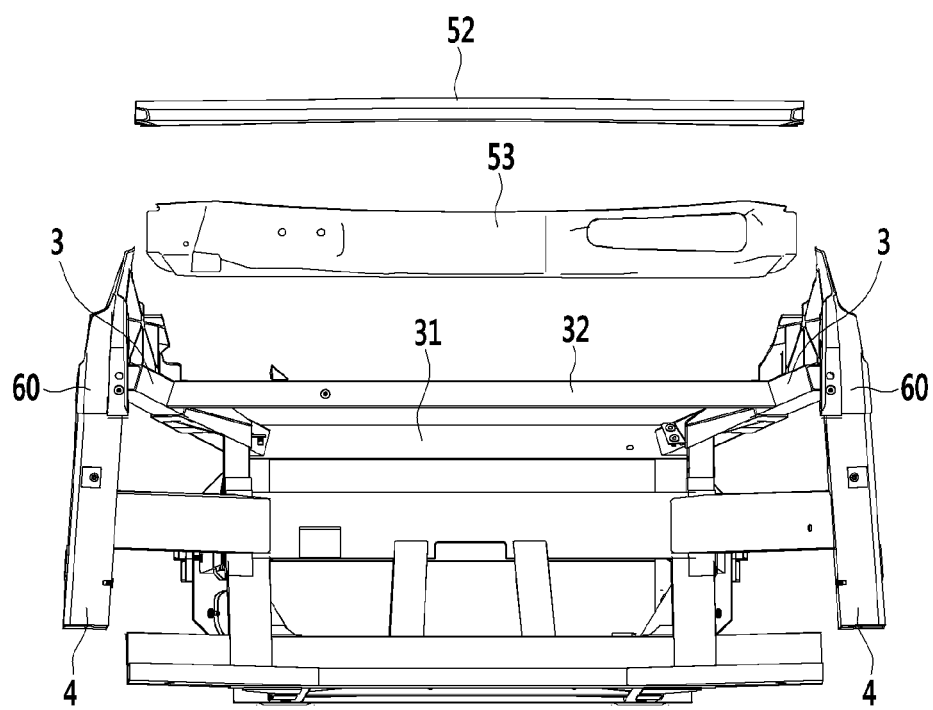
FIG. 4 is an exploded perspective view of the front vehicle body structure according to the exemplary embodiment of the present invention.

Referring to FIG. 4, rear portions of the left and right fender apron upper members 3 in the length direction of the vehicle may be connected to each other by a rear upper cross reinforcement member 32 extended in the width direction of the vehicle, and a cowl panel 53 extended in the width direction of the vehicle may be provided between the cowl upper cross reinforcement member 52 and the rear upper cross reinforcement member 32 and thus integrally coupled therewith.

The front lower side member 1, the front upper side member 2, and the fender apron upper member 3 may be connected to each other by a reinforcement panel 70 extended in the height direction of the vehicle.

The front lower side member 1 and the front upper side member 2 may be connected to each other by a front side reinforcement member 80 extended in the height direction of the vehicle at a substantially center portion in the length direction of the vehicle.

A second joint 62 may be coupled to a portion where the front lower side member 1 and the center lower cross reinforcement member 12 are connected, a third joint 64 may be coupled to a portion where the front lower side member 1 and the dash lower cross reinforcement member 50 are connected, a fourth joint 66 may be coupled to the front upper side member 2, and a fifth joint 58 may be coupled to the fender apron upper member 3.

The first joint 60 to the fifth joint 68 may be made of, for example, an aluminum material using a die-casting method, or these joints may be made of an aluminum material using an extrusion method.

Figure 5:
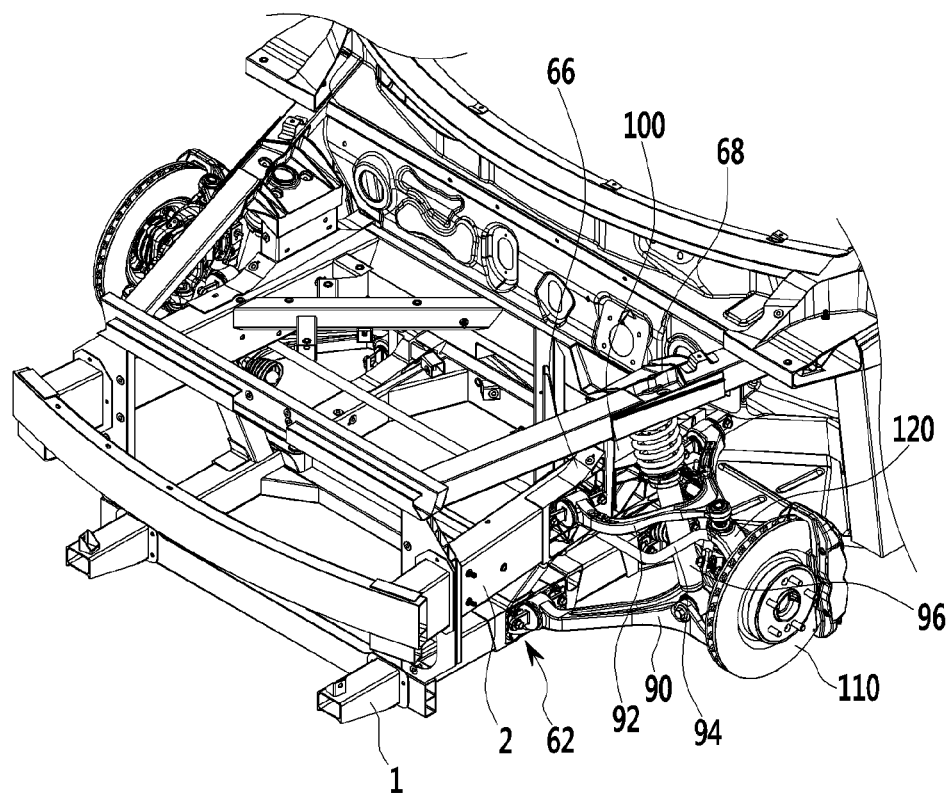
FIG. 5 is a perspective view of a state in which a suspension system is installed in the front vehicle body structure according to the exemplary embodiment of the present invention.

Referring to FIG. 5, lateral ends of a lower arm 90 that forms a suspension arm are respectively engaged to and thus supported by the second joint 62 and the third joint 64, and a stabilizer bar 94 that controls moment movement of the vehicle is provided in the fourth joint 66 by being extended in the width direction of the vehicle.

The fourth joint 66 and the fifth joint 68 may be connected to each other by a shock absorber mounting reinforcement member 100, and an upper portion of a shock absorber 96, forming a suspension device, may be fastened to and thus supported by the fifth joint 68.

Reference numeral 110 denotes a brake disk for braking vehicle wheels, and reference numeral 120 denotes a knuckle for steering the vehicle wheels, and the lower arm 90 and the upper arm 92 may be fastened to and thus supported by the knuckle 120.

Figure 6:
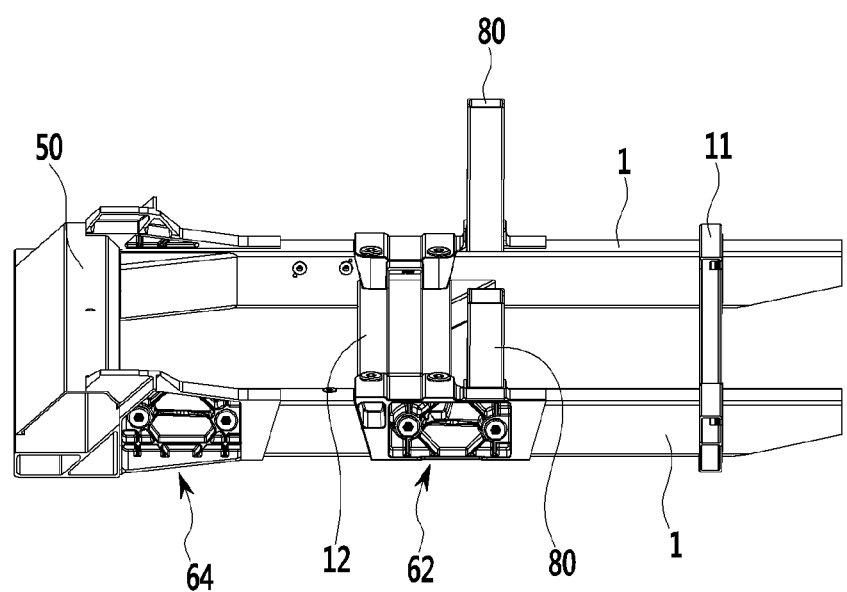
FIG. 6 is a perspective view illustrating coupling of a front lower side member and reinforcement members of the front vehicle body structure according to the exemplary embodiment of the present invention.
Figure 7:
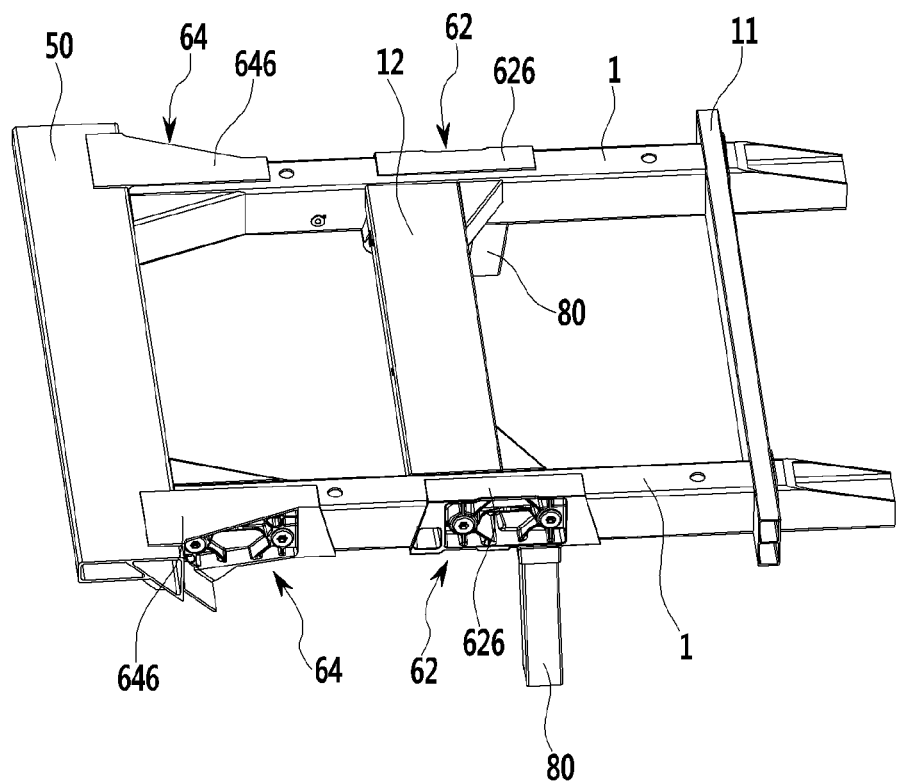
FIG. 7 is a perspective view of a bottom part of FIG. 6.

Referring to FIGS. 6 and 7, the second joint 62 may be coupled to the front lower side member 1 and the center lower cross reinforcement member 12, and the third joint 64 may be coupled to the front lower side member 1 and the dash lower cross reinforcement member 50.

Figure 8:
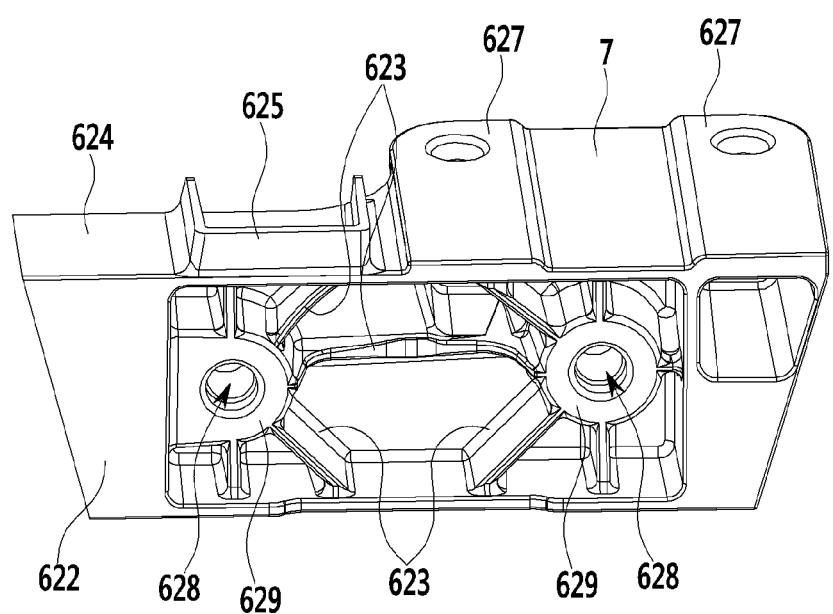
FIG. 8 is a perspective view of a second joint of the front vehicle body structure according to the exemplary embodiment of the present invention.

Referring to FIG. 8, the second joint 62 may include a second joint body 622 substantially formed in the shape of a quadrangular plate, an upper flange 624 bent inward in the width direction of the vehicle from an upper end edge of the second joint body 622 and thus coupled to an upper surface of the front lower side member 1 in the height direction of the vehicle, and a lower flange 626 (see FIG. 7) bent inward in the width direction of the vehicle from a lower end edge of the second joint body 622 and thus coupled to a bottom surface of the front lower side member 1 in the height direction of the vehicle.

A coupling flange 625 to which one end of the front side reinforcing member 80 is coupled by being inserted may be formed protruding upward along the height direction of the vehicle in the upper flange 624, and may include two extension bosses 627 further extended inward from the upper flange 624 along the width direction of the vehicle so as to be fastened to the center lower cross reinforcement member 12 at two positions.

Two fastening bosses 629 respectively provided with fastening holes 628 which are distanced from each other along the length direction of the vehicle may be formed protruding from the second joint body 622, and one end of the lower arm 90 may be coupled to the two fastening holes 628 by being engaged to the fastening holes 628.

A plurality of radial ribs 623 may be integrally protruded in the second joint body 622, and the plurality of radial ribs 623 enhance structural rigidity by connecting the two fastening bosses 629 each other and connecting the respective fastening bosses 629 to the second joint body 622.

Figure 9:
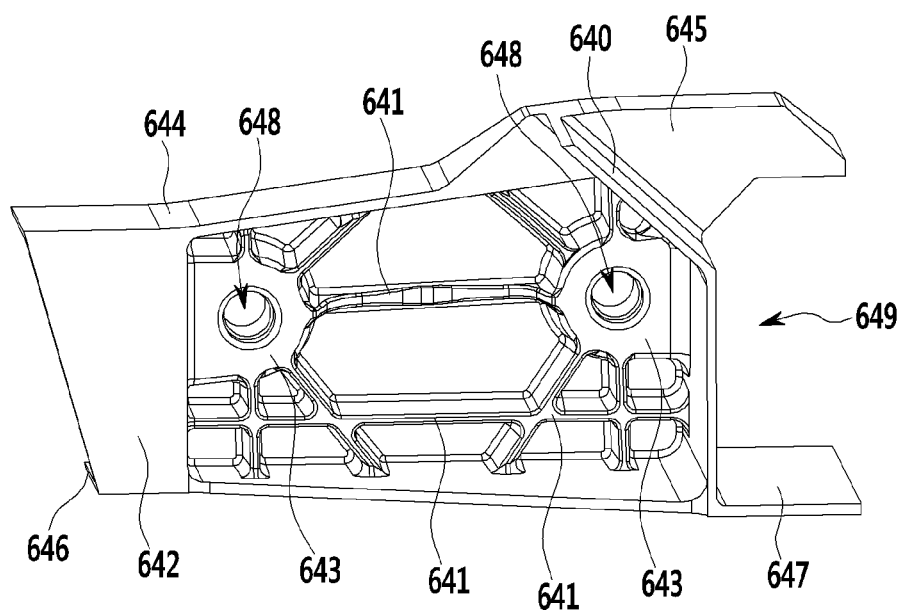
FIG. 9 is a perspective view of a third joint of the front vehicle body structure according to the exemplary embodiment of the present invention.

Referring to FIG. 9, the third joint 64 may include a third joint body 642 substantially formed in the shape of a quadrangular plate, an upper flange 644 bent inward from an upper end edge of the third joint body 642 in the width direction of the vehicle and thus coupled to an upper surface of the front lower side member 1 in the height direction of the vehicle, and a lower flange 646 (see FIG. 7) bent inward in the width direction of the vehicle from a lower end edge of the third joint body 642 and thus coupled to a bottom surface of the front lower side member 1 in the height direction of the vehicle.

The third joint 64 may further include an upper extension flange 645 further extended from a rear upper end edge of the third joint body 642 in the length direction of the vehicle and thus disposed in an upper portion in the height direction of the vehicle and a lower extension flange 647 further extended from a rear end edge of the third joint body 642 in the length direction of the vehicle and thus disposed in a lower portion in the height direction of the vehicle.

A coupling groove 649 to which the dash lower cross reinforcement member 50 is coupled by being inserted may be formed between the upper extension flange 645 and the lower extension flange 647.

Two fastening bosses 643 respectively provided with two fastening holes 648 disposed at a distance from each other along the length direction of the vehicle are protruded in the third joint body 642, and the other end of the lower arm 90 may be coupled to the fastening holes 648 by being engaged to the fastening holes 648.

A plurality of radial ribs 641 may be integrally protruded in the third joint body 642 to enhance structural rigidity by connecting the two fastening bosses 643 and connecting the respective fastening bosses 643 to the third joint body 642.

An inclined surface 640 is formed adjacent to the upper extension flange 645 by being inclined toward a lower direction in the length direction and the height direction of the vehicle such that a rear side lower reinforcement member 140 may be coupled to the inclined surface 140 by being mounted to the inclined surface 140.

Figure 10:
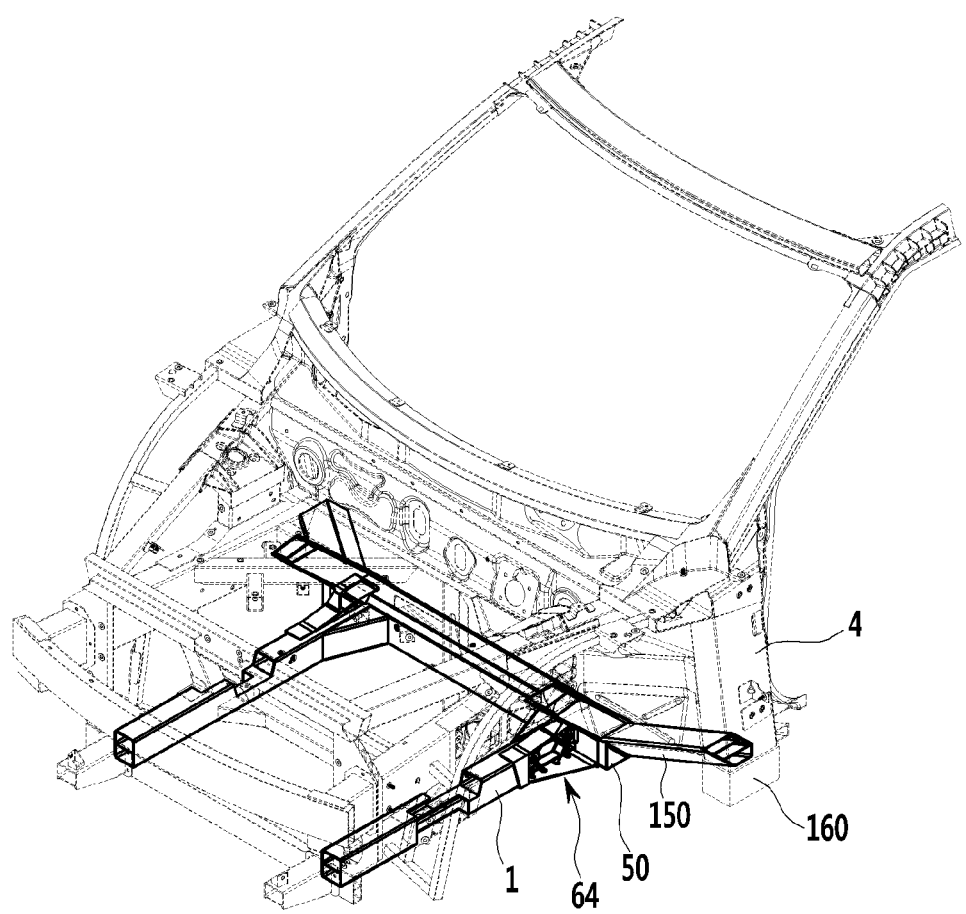
FIG. 10 is a perspective view of the periphery of a dash lower cross reinforcement member of the front vehicle body structure according to the exemplary embodiment of the present invention.

Referring to FIG. 10, one end of the dash lower side member 150 is coupled to lateral ends of the dash lower cross reinforcement member 50 in the width direction of the vehicle, and the other end of the dash lower side member 150 may be coupled to a side seal 160 extended in the length direction of the vehicle.

Figure 11:
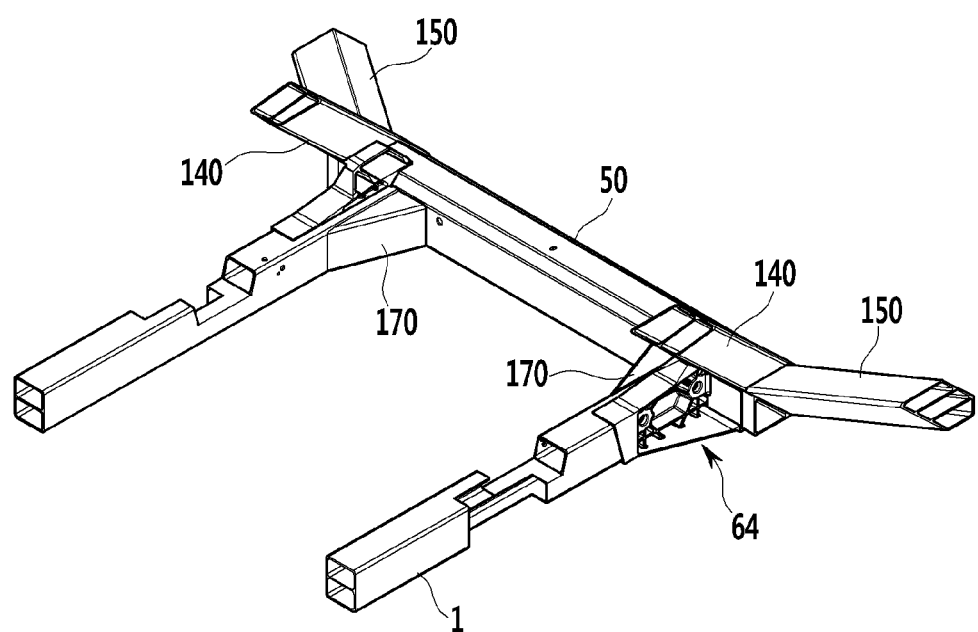
FIG. 11 is a perspective view of the dash lower cross reinforcement member of the front vehicle body structure according to the exemplary embodiment of the present invention.
Figure 12:
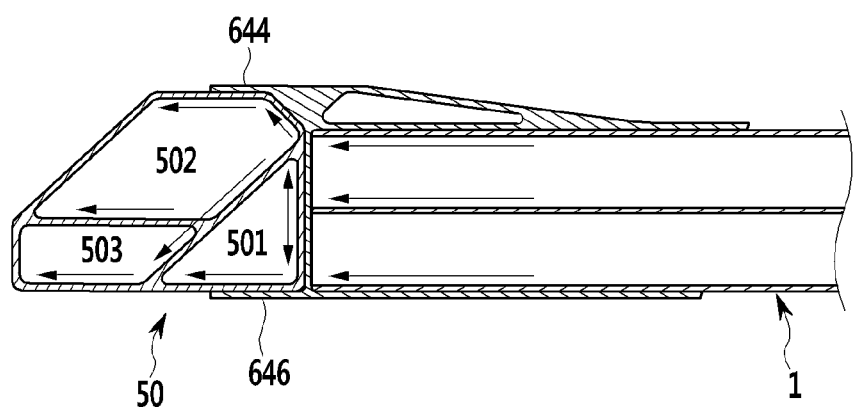
FIG. 12 is a cross-sectional view of the dash lower cross reinforcement member and a front lower side member of the front vehicle body structure according to the exemplary embodiment of the present invention.

Referring to FIG. 11, a reinforcement bracket 170 may be provided in each corner where the front lower side member 1 and the dash lower cross reinforcement member 50 intersect each other, the reinforcement bracket 170 configured to substantially fill or cover the corner.

The reinforcement bracket 170 may be substantially formed in the shape of a triangular block.

The connection rigidity of the front lower side member 10 and the dash lower cross reinforcement member 50 can be enhanced by the reinforcement bracket 170 such that distortion rigidity of the front lower body of the vehicle can be improved.

The dash lower cross reinforcement member 50 may include a triangular-shaped cross-section 501, a pentagonal-shaped second cross-section 502 that shares an oblique side of the first cross-section 501, and a quadrangular-shaped third cross-section 503 that shares the oblique side of the first cross-section 501 and the bottom side of the second cross-section 502, and may be extrusion-molded using a single extruded material.

Accordingly, when an impact load is transferred through the front lower side member 1 as shown by arrows, multiple cross-sections of the dash lower cross reinforcement member 50 counteract the impact and the impact load can be effectively transmitted to other portions of the vehicle, connected with the dash lower cross reinforcement member 50 through the multiple cross-sections.

Figure 13:
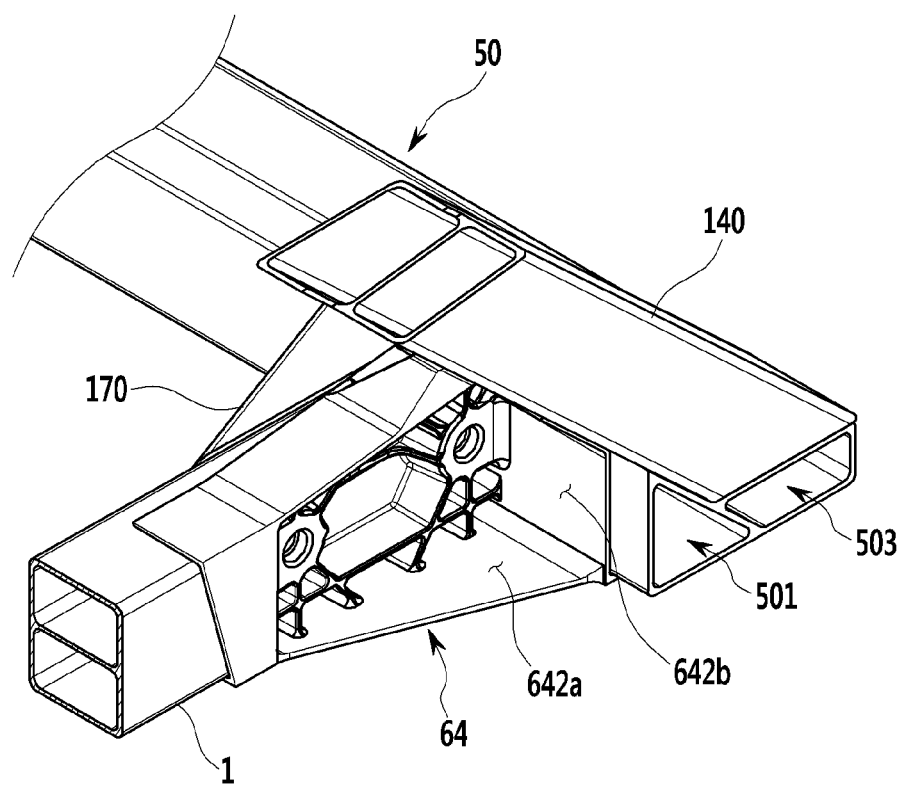
FIG. 13 is a perspective view illustrating coupling of the third joint and vehicle members of the front vehicle body structure according to the exemplary embodiment of the present invention.

Referring to FIG. 13, when the rear side lower reinforcement member 140 is coupled with the dash lower cross reinforcement member 50, a coupling groove is formed by cutting the second cross-section 502 of the dash lower cross reinforcement member 140 and the rear side lower reinforcement member 140 is coupled to the dash lower cross reinforcement member 140 by being inserted to the coupling groove such that coupling rigidity can be enhanced.

In the third joint body 642, an expansion horizontal surface 742a extended outward in the width direction of the vehicle while being substantially shaped in a triangle and an expansion vertical surface 642b extended upward in the height direction of the vehicle from one edge of the expansion horizontal surface 742a are provide to rigidly support the width directional load and the height directional load of the vehicle.

Figure 14:
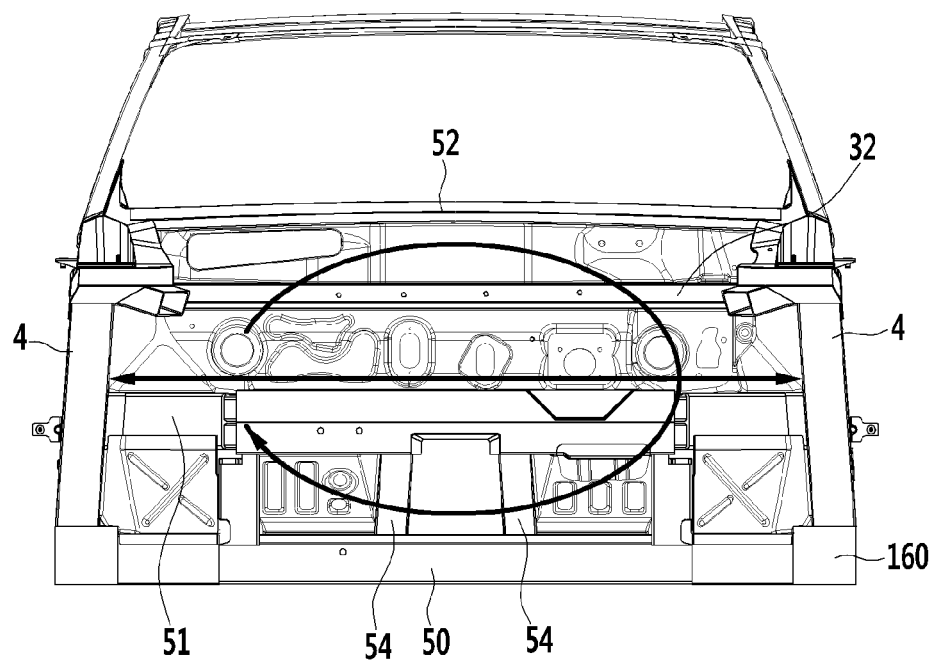
FIG. 14 is a front view of the front vehicle body structure according to the exemplary embodiment of the present invention.

Referring to FIG. 14, the front vehicle body structure according to the exemplary embodiment of the present invention is formed with a "日" shaped truss structure by the left and right side front pillars 4 and the dash lower cross reinforcement member 50, the dash center cross reinforcement member 51, the rear upper cross reinforcement member 32, and the cowl cross upper member 52 sequentially from the bottom to the top in the length direction of the vehicle when viewed from a front of the vehicle such that the connection rigidity between the up, down, left, and right members of the vehicle can be enhanced, thereby improving stiffness of the front vehicle body.

Figure 15:
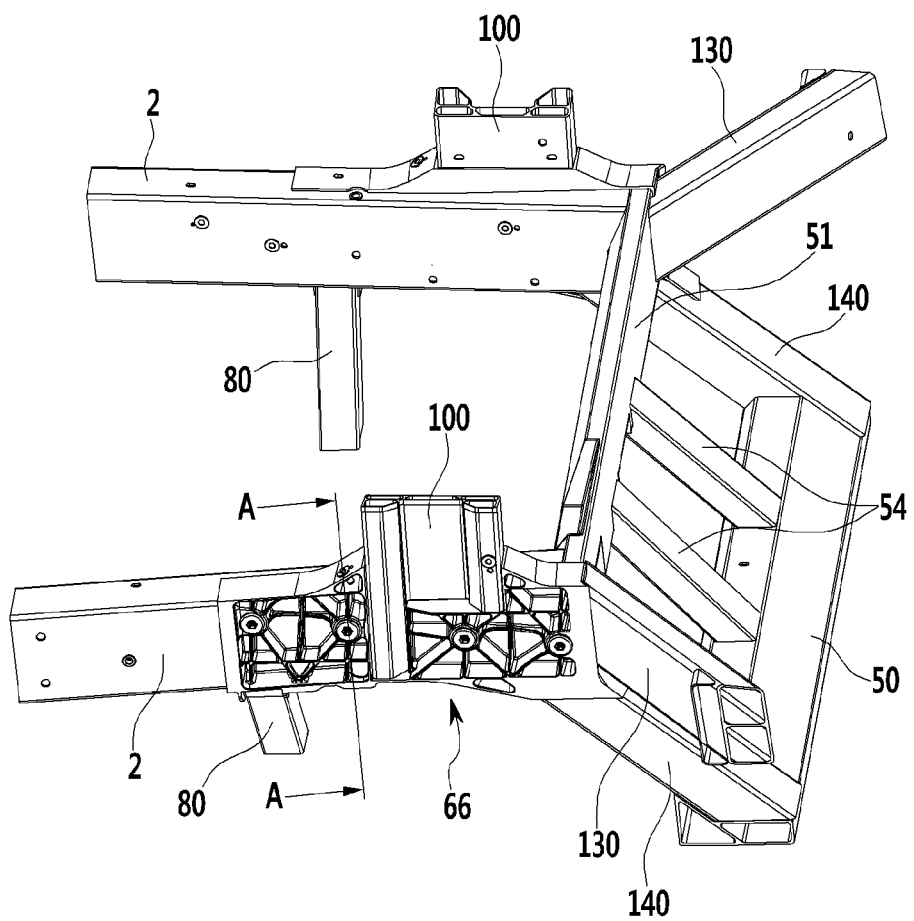
FIG. 15 is a perspective view illustrating coupling of a front upper side member and the dash cross reinforcement members of the front vehicle body structure according to the exemplary embodiment of the present invention.

Referring to FIG. 15, the dash center cross reinforcement member 51 may be connected with the front pillar member 4 through the rear side reinforcement member 130, and the front upper side member 2 may be connected with the dash lower cross reinforcement member 50 through the rear side lower reinforcement member 140.

Further, the dash lower cross reinforcement member 50 and the dash center cross reinforcement member 51 may be integrally connected with each other by two front tunnel side members 54, each extended with a slope to a front side in the height direction of the vehicle and a front side in the length direction of the vehicle.

The two front tunnel side members 54 may be disposed at a distance from each other along the width direction of the vehicle, or may form an entrance of a tunnel extended to a rear side along the length direction of the vehicle.

The dash lower cross reinforcement member 50 may cross the tunnel and may be made of a single extruded material.

The fourth joint 66 is mounted to the front upper side member 2, a front portion of the fourth joint 66 in the length direction of the vehicle is coupled with the front side reinforcement member 80, a rear portion of the fourth joint 66 in the length direction of the vehicle may be coupled with the rear side reinforcement member 130 and the rear side lower reinforcement member 140, and the shock absorber mounting reinforcement member 100 may be coupled to the fourth joint 66 by being inserted thereinto.

Figure 16:
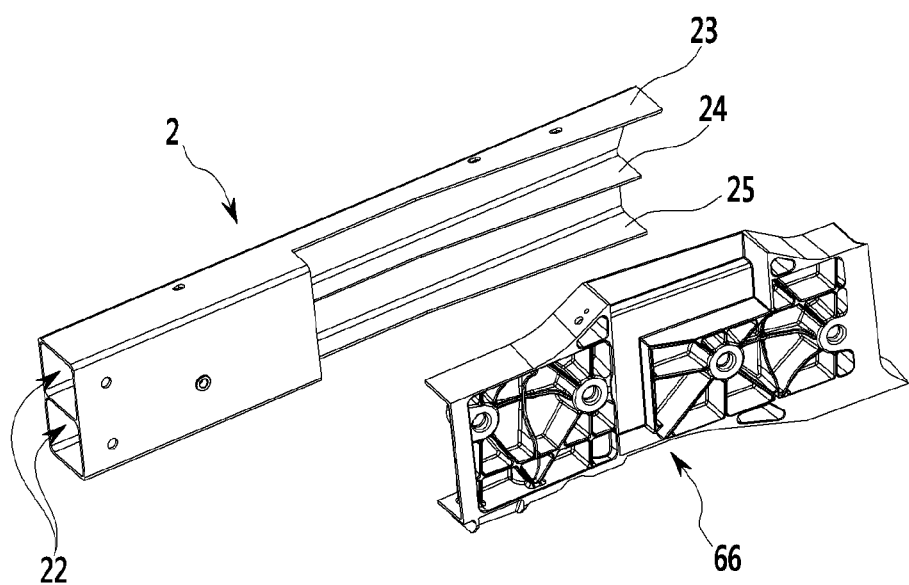
FIG. 16 is an exploded perspective view of the front upper side member and the fourth joint of the front vehicle body structure according to the exemplary embodiment of the present invention.
Figure 17:
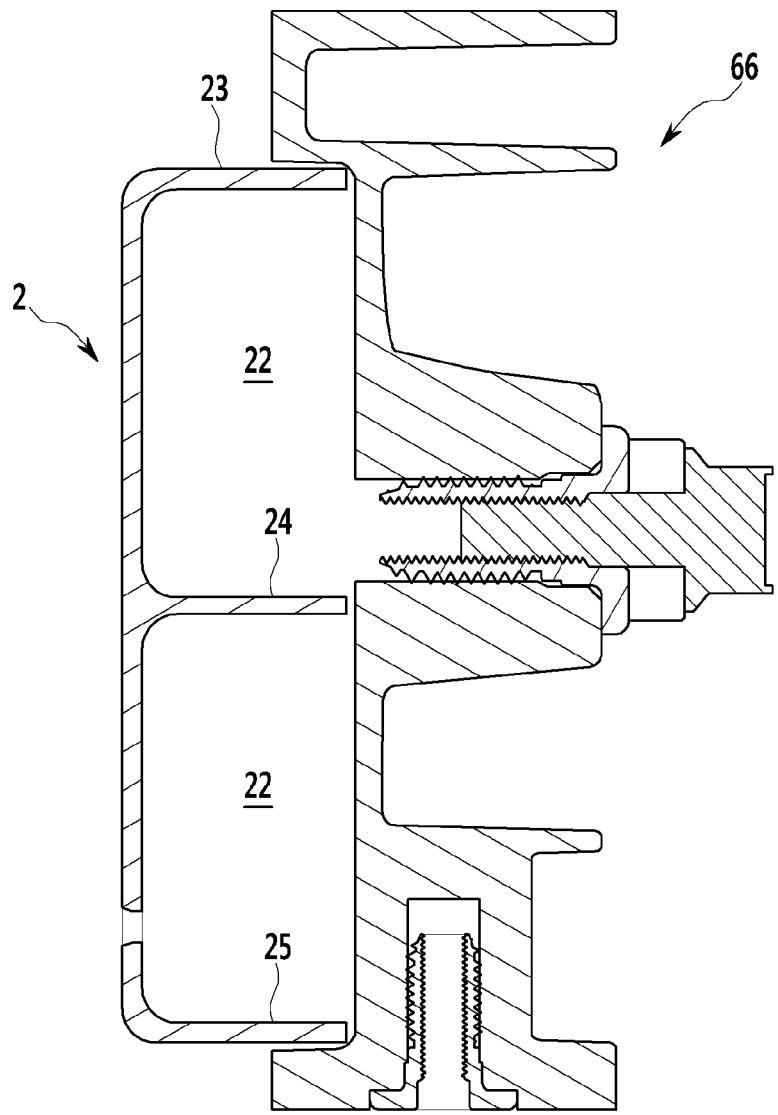
FIG. 17 is a cross-sectional view of FIG. 15, taken along the line A-A.

Referring to FIGS. 16 and 17, vertically disposed double closed cross-sections 22 of the front upper side member 2 may extend in the length direction of the front upper side member 2, and an upper wall 23, a middle wall 24, and a lower wall 25 forming the double closed cross-sections 22 may be partially cut, and the fourth joint 4 may be coupled with the front upper side member 2 in a manner of covering the cut portion.

Figure 18:
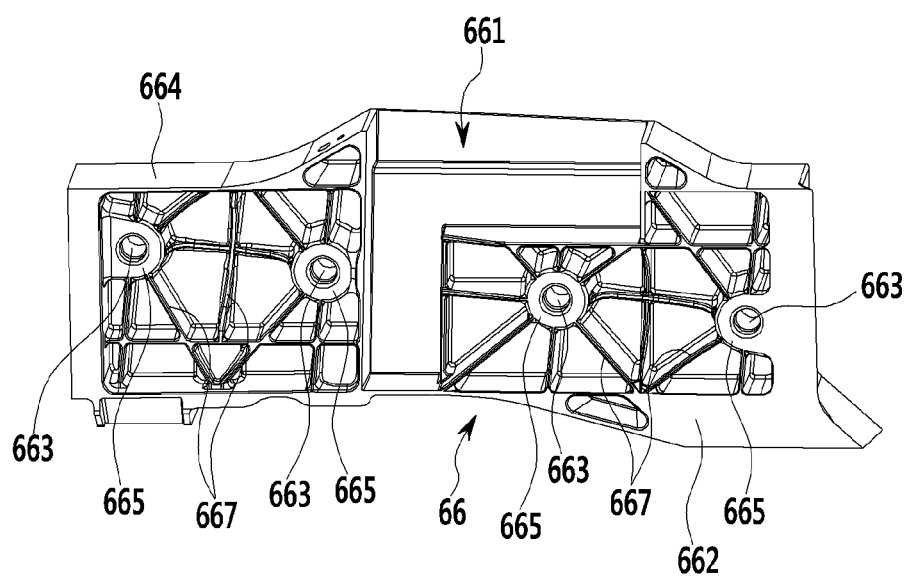
FIG. 18 is a perspective view of the fourth joint of the front vehicle body structure according to the exemplary embodiment of the present invention.
Figure 19:
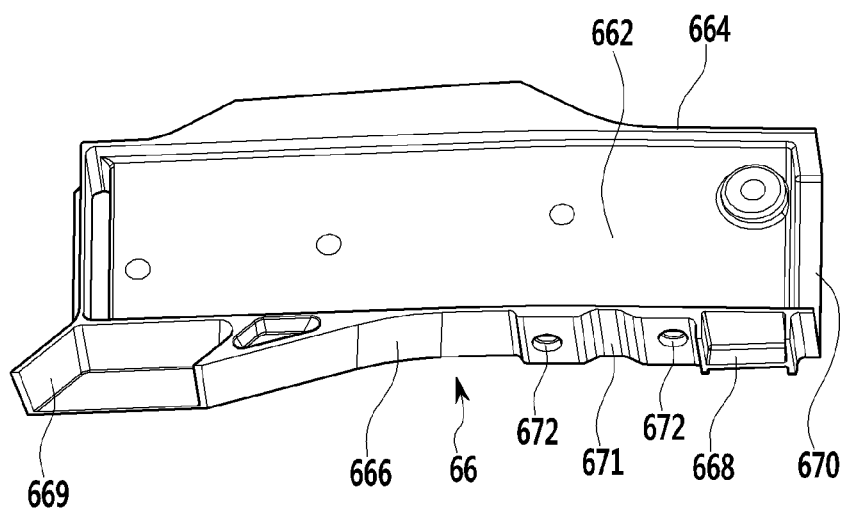
FIG. 19 is a perspective view illustrating a rear side of the fourth joint of the front vehicle body structure according to the exemplary embodiment of the present invention.

Referring to FIGS. 18 and 19, the fourth joint 66 may include a fourth joint body 552 substantially formed in the shape of a quadrangular plate, an upper flange 664 bent inward in the width direction of the vehicle from an upper end edge of the fourth joint body 661 and thus coupled to an upper surface of the front upper side member 2 in the height direction of the vehicle, and a lower flange 666 bent inward in the width direction of the vehicle from a lower end edge of the fourth joint body 662 and thus coupled to the bottom surface of the front upper side member 2 in the height direction of the vehicle.

A coupling groove 661 may be provided substantially in a center portion in the length direction of the fourth joint body 662 such that the shock absorber mounting reinforcement member 100 is coupled to the fourth joint body 662 by being inserted into the coupling groove 661, and two fastening bosses 665 protrude in a front side with reference to the coupling groove 661 and respectively have fastening grooves 663 in which one end of the upper arm 92 is fastened, and two fastening bosses 663 protrude in a rear side with reference to the coupling groove 661 and respectively have fastening grooves 663 in which the other end of the upper arm 92 is fastened, and the respective two fastening bosses 662 are connected with each other by a plurality of radial reinforcement ribs 667 such that structural rigidity can be enhanced.

The lower flange 666 is provided with a first coupling flange 668 in which the other end of the front side reinforcement member 80 is coupled by being inserted and a second coupling flange 669 in which the rear side lower reinforcement member 140 is coupled by being inserted, and a third coupling flange 670 in which the rear side reinforcement member 130 is coupled by being inserted may be provided in a rear end portion in the length direction of the fourth joint body 662.

A support groove 671 in which a stabilizer bar 94 is supported by being inserted and fastening holes 672 fastening the stabilizer bar 94 to the lower flange 666 with a mounting bracket (not shown) may be formed in the lower flange 666.

The first coupling flange 668, the second coupling flange 669, and the third coupling flange 67, each may be respectively formed to have a "ㄷ" shaped cross-section.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A front vehicle body structure, comprising:
    front lower side members extended in a length direction of a vehicle, and disposed at left and right sides in a width direction of the vehicle;
    a dash lower cross reinforcement member extended in the width direction of the vehicle, and to which a rear end of each of the front lower side members in the length direction of the vehicle is coupled; and
    joints to which the rear ends of the left and right front lower side members and the dash lower cross reinforcement member are coupled,
    wherein one end of a rear side lower reinforcement member obliquely disposed in a length directional front side of the vehicle and a height directional upper side of the vehicle is coupled by being inserted to lateral ends of the dash lower cross reinforcement member in the width direction of the vehicle, and wherein another end of the rear side lower reinforcement member is connected to a dash center cross reinforcement member extended in the width direction of the vehicle.

2. The front vehicle body structure of claim 1, wherein reinforcement brackets are attached to corners where the front lower side members and the dash lower cross reinforcement member intersect.

3. The front vehicle body structure of claim 2, wherein each of the reinforcement brackets is attached while filling a portion of the corner.

4. The front vehicle body structure of claim 2, wherein each of the reinforcement brackets is formed in the shape of a triangular block.

5. The front vehicle body structure of claim 1, wherein ends of the dash lower side members are coupled to lateral ends of the dash lower cross reinforcement member in the width direction of the vehicle, and other ends of the dash lower side members are coupled to a side seal extended in the length direction of the vehicle.

6. The front vehicle body structure of claim 1, wherein the dash lower cross reinforcement members have multiple cross-sections.

7. The front vehicle body structure of claim 6, wherein the multiple cross-sections comprise:
a triangular-shaped first cross-section;
a pentagonal-shaped second cross-section sharing an oblique side of the first cross-section; and
a quadrangular-shaped third cross-section sharing the oblique side of the first cross-section and a bottom side of the second cross-section.

8. The front vehicle body structure of claim 1, wherein the dash lower cross reinforcement member is extrusion-molded using a single extruded material.

9. The front vehicle body structure of claim 1, wherein the joint includes:
a joint body formed as a quadrangular plate;
an upper flange bent inward in the width direction of the vehicle from an upper end edge of the joint body and thus coupled to an upper surface of the front lower side member in the height direction of the vehicle; and
a lower flange bent inward in the width direction of the vehicle from a lower end edge of the joint body and thus coupled to a bottom surface of the front lower side member in the height direction of the vehicle.

10. The front vehicle body structure of claim 9, further comprising:
an upper extension flange disposed in an upper portion in the height direction of the vehicle by being further extended to a rear side from a rear side upper end edge of the joint body in the length direction of the vehicle; and
a lower extension flange disposed in a lower portion in the height direction of the vehicle by being further extended to a rear side from a rear side lower end edge of the joint body in the length direction of the vehicle, wherein the dash lower cross reinforcement member is coupled by being inserted between the upper extension flange and the lower extension flange.

11. The front vehicle body structure of claim 9, wherein two fastening bosses, each provided with a fastening hole, are formed by protruding in the joint body, and the two fastening bosses are disposed at a distance from each other in the length direction of the vehicle, and one end of a lower arm is coupled by being fastened to the fastening holes.

12. The front vehicle body structure of claim 11, wherein a plurality of radial ribs are formed by integrally protruding in the joint body, and the plurality of radial ribs connect the two fastening bosses to each other and connect the respective fastening bosses to the joint body.

13. The front vehicle body structure of claim 10, wherein an inclined surface inclined in the length direction of the vehicle and a lower side in the height direction of the vehicle is formed adjacent to the upper extension flange such that the rear side lower reinforcement member inclined in the front side of the length direction of the vehicle and the upper side of the height direction of the vehicle is coupled by being mounted to the inclined surface.

14. The front vehicle body structure of claim 7, wherein the second cross-section of the dash lower cross reinforcement member is cut such that a coupling groove is formed, and the rear side lower reinforcement member inclined in the front side of the length direction of the vehicle, and the upper side of the height direction of the vehicle is coupled by being inserted to the coupling groove.

15. The front vehicle body structure of claim 9, wherein the joint body is provided with an expansion horizontal surface expanded as a triangle to the outer side in the width direction of the vehicle and a quadrangular-shaped expansion vertical surface extended upward in the height direction of the vehicle from one edge of the expansion horizontal surface.

16. The front vehicle body structure of claim 1, wherein the dash center cross reinforcement member and the dash lower cross reinforcement member are connected to each other by two front tunnel side members.

17. The front vehicle body structure of claim 16, wherein the two front tunnel side members extend with an inclination in the height direction of the vehicle and a front side in the length direction of the vehicle, and are disposed at a distance from each other along the width direction of the vehicle such that an entrance of a tunnel extended in a rear side along the length direction of the vehicle is formed.

18. The front vehicle body structure of claim 17, wherein the dash lower cross reinforcement member crosses the tunnel and is made of a single extruded material.

19. The front vehicle body structure of claim 1, wherein the dash lower cross reinforcement member, a rear upper cross reinforcement member disposed higher than the dash center cross reinforcement member in the height direction of the vehicle and extended in the width direction of the vehicle, a cowl cross upper member disposed higher than the rear upper cross reinforcement member and extended in the width direction of the vehicle, and front pillar members extended in the height direction of the vehicle and disposed in the left and right sides of the vehicle form a "H" shaped truss structure.

* * * * *